(12) United States Patent
Vannier (10) Patent No.: US 8,270,819 B2
(45) Date of Patent: Sep. 18, 2012

(54) PERFORMING TRICK PLAY FUNCTIONS IN A DIGITAL VIDEO RECORDER WITH EFFICIENT USE OF RESOURCES

(75) Inventor: Eric Vannier, Union City, CA (US)

(73) Assignee: TiVo Inc., Alviso, CA (US)

( * ) Notice: Subject to any disclaimer, the term of this patent is extended or adjusted under 35 U.S.C. 154(b) by 1230 days.

(21) Appl. No.: 11/928,828

(22) Filed: Oct. 30, 2007
(Under 37 CFR 1.47)

(65) Prior Publication Data
US 2008/0107401 A1   May 8, 2008

Related U.S. Application Data

(60) Provisional application No. 60/855,890, filed on Oct. 31, 2006.

(51) Int. Cl.
H04N 5/783 (2006.01)
H04N 5/917 (2006.01)
H04N 5/775 (2006.01)
H04N 5/93 (2006.01)

(52) U.S. Cl. ........ 386/343; 386/350; 386/356; 386/230; 386/279; 386/283; 375/240

(58) Field of Classification Search .................. 386/329, 386/283, 343, 350, 356, 230, 279; 375/240
See application file for complete search history.

(56) References Cited

U.S. PATENT DOCUMENTS

| | | | |
|---|---|---|---|
| 5,973,685 A | 10/1999 | Schaffa et al. | |
| 6,141,447 A * | 10/2000 | Linzer et al. | 382/236 |
| 6,181,746 B1 | 1/2001 | Hoshi et al. | |
| 7,456,760 B2 * | 11/2008 | Normile et al. | 341/50 |
| 7,734,116 B2 * | 6/2010 | Panabaker et al. | 382/284 |
| 2001/0049820 A1 | 12/2001 | Barton | |

(Continued)

FOREIGN PATENT DOCUMENTS
EP  1199890 A2  4/2002
(Continued)

OTHER PUBLICATIONS

Chinese Patent Office, "First Office Action", application No. CN 200780040918.7, Sep. 9, 2010, 14 pages.

(Continued)

*Primary Examiner* — Helen Shibru
(74) *Attorney, Agent, or Firm* — Hickman Palermo Truong Becker Bingham Wong LLP; Kirk D. Wong (57) ABSTRACT

Techniques for selecting a picture of a video program for display in accordance with a selected trick play mode of a DVR are described herein. Sometimes, when desired playback speed is faster than normal, a DVR is forced to select some pictures to play and some pictures to skip. Ideally, in order to preserve "smooth" viewing quality, the next picture to be displayed should be temporally close to the currently displayed picture. Since some pictures can take longer to decode than others, accounting for picture decoding costs helps ensure that the best picture can be selected for decoding given playback speed requirements. According to one embodiment of the invention, for each picture of a plurality of pictures in a video data stream, a DVR determines a decoding cost for that picture. Based on the determined costs, the DVR selects a particular picture. The DVR outputs the selected picture for display.

24 Claims, 4 Drawing Sheets

U.S. PATENT DOCUMENTS

| | | | |
|---|---|---|---|
| 2003/0145323 | A1 | 7/2003 | Hendricks et al. |
| 2003/0149975 | A1 | 8/2003 | Eldering et al. |
| 2004/0003397 | A1 | 1/2004 | Boston et al. |
| 2004/0015608 | A1 | 1/2004 | Ellis et al. |
| 2004/0148454 | A1 | 7/2004 | Seo |
| 2004/0190867 | A1* | 9/2004 | Roelens ............... 386/68 |
| 2004/0268387 | A1 | 12/2004 | Wending |
| 2004/0268413 | A1 | 12/2004 | Reid et al. |
| 2005/0010950 | A1 | 1/2005 | Carney et al. |
| 2005/0074063 | A1 | 4/2005 | Nair et al. |
| 2005/0076359 | A1 | 4/2005 | Pierson et al. |
| 2005/0086703 | A1 | 4/2005 | Gupta et al. |
| 2005/0273828 | A1 | 12/2005 | Barton |
| 2005/0278747 | A1 | 12/2005 | Barton et al. |
| 2005/0289588 | A1 | 12/2005 | Kinnear |
| 2005/0289636 | A1 | 12/2005 | Schiller |
| 2006/0029364 | A1* | 2/2006 | Kosugi ............... 386/68 |
| 2006/0041902 | A1 | 2/2006 | Zigmond |
| 2006/0088279 | A1 | 4/2006 | Tsunashima et al. |
| 2006/0100928 | A1 | 5/2006 | Walczak et al. |
| 2006/0184579 | A1 | 8/2006 | Mills et al. |
| 2006/0223593 | A1 | 10/2006 | Ishak |
| 2007/0100690 | A1 | 5/2007 | Hopkins |
| 2008/0013622 | A1* | 1/2008 | Bao et al. ............... 375/240.1 |
| 2008/0060002 | A1 | 3/2008 | Noll et al. |
| 2008/0062018 | A1* | 3/2008 | Normile et al. ............ 341/50 |
| 2008/0127249 | A1 | 5/2008 | Cruice |
| 2009/0135901 | A1* | 5/2009 | Au et al. ............... 375/240.02 |

FOREIGN PATENT DOCUMENTS

| | | |
|---|---|---|
| JP | 2001-285777 | 10/2001 |
| JP | 2004-304405 | 10/2004 |
| WO | WO 01/91474 A2 | 11/2001 |
| WO | WO 02/433885 | 5/2002 |
| WO | WO 02/082374 A2 | 10/2002 |
| WO | WO 03/10965 a1 | 2/2003 |
| WO | WO 03/075569 A2 | 9/2003 |
| WO | WO 2005/034503 a2 | 4/2005 |
| WO | WO 2005/107253 | 11/2005 |
| WO | WO 2006/091313 | 8/2006 |

OTHER PUBLICATIONS

Claims, application No. CN 200780040918.7, 5 pages.
The State Intellectuall Property Office of the People's Republic of China, Application No. 200780040475.1, Dated Nov. 30, 2010, 8 pages.
Claims for Application No. 200780040475.1, 7 pages.
Examiner's First Report for Australian patent application No. 2007313659, dated Apr. 13, 2010, 3 pages.
Current claims for Australian patent application No. 2007313659, 6 pages.
Examiner's First Report for Australian patent application No. 2007314276, dated Apr. 20, 2010, 2 pages.
Current claims for Australian patent application No. 2007314276, 5 pages.
Examiner's First Report for Australian patent application No. 2007313700, dated May 6, 2010, 2 pages.
Current claims for Australian patent application No. 2007313700, 6 pages.
Microsoft Computer Dictionary, Definition of "Queue" (Third edition), Aug. 1997, 1 page.
Dictionary.com, Definition of "Queue", retrieved from [URL:http://dictionary.reference.com/browse/queque] on Apr. 5, 2011, 2 pages.
International Search Report and Written Opinion for PCT application No. PCT/US07/23049 dated Mar. 14, 2008, 6 pages.
Examiner's First Report for Australian patent application No. 2007314276 dated Apr. 20, 2010, 2 pages.
Canadian Intellectuall Property Office, "Office Action", Application No. 2,662,665, Applicant: Tivo Inc., dated May 31, 2011, 2 pages.
Current Claims, Application No. 2,662,665, Applicant: Tivo Inc., dated May 2011, 12 pages.
Singapore Application No. 189554, Search Report dated Jul. 15, 2010, 20 pgs.
Singapore Application No. 189554, Written Opinion, dated Jul. 15, 2010, 10 pgs.
Singapore Application No. 189554, Current claims, 9 pgs.
Hungarian Patent Office, International Search Report and Written Opinion, Singapore Patent Application No. 2009027020, dated Jul. 15, 2010, 23 pages.
Singapore Patent Application No. 2009027020, Claims as of Jul. 15, 2010, 6 pages.
Canadian Intellectual Property Office, Application No. 2,665,731, Office Action dated Nov. 26, 2010, 2 pages.
Canadian Application No. 2,665,731, Claims as of Nov. 26, 2010, 5 pages.
Canadian Intellectual Property Office, Application No. 2,665,731, Office Action dated Nov. 7, 2011, 2 pages.
Canadian Application No. 2,665,731, Claims as of Nov. 7, 2011, 8 pages.
Canadian Intellectual Property Office, Application No. 2,662,825, Office Action dated Dec. 14, 2010, 2 pages.
Canadian Application No. 2,662,825, Claims as of Dec. 14, 2010, 6 pages.
The State Intellectual Property Office of the People's Republic of China, "Notification of the Second Office Action", Chinese Patent Application No. 200780040918.7 dated Apr. 20, 2011, 11 pages. (English translation included).
Chinese Patent Application No. 200780040918.7, Claims as of Apr. 20, 2011, 3 pages.
European Patent Office, Extended European Search Report received in EP application No. 07844743.0, dated Oct. 4, 2011, 7 pages.
European application No. 07844743.0, Claims as of Oct. 4, 2011, 4 pages.
"Notification of Reasons for Rejection" received in Japanese Patent Application No. 2009-534947, dated Dec. 6, 2011, 4 pages. (English translation included).
Japanese Patent Application No. 2009-534947, Claims as of Dec. 6, 2011, 6 pages.
"Notification of Reason for Rejection" received in Japanese Patent Application No. 2009-534943, dated Jan. 4, 2012, 10 pages. (English translation included).
Japanese Patent Application No. 2009-534943, Claims as of Jan. 4, 2012, 8 pages.
Intellectual Property Office of Singapore, "Office Action" in Application No. 200902701-2, dated Jul. 7, 2011, 6 pages.
Current Claims for Application No. 200902701-2, dated Jul. 2011, 5 pages.
Claims, PCT/US07/83201, 6 pages.
International Searching Authority, "Notification of Transmittal of the International Search Report and the Written Opinion of the International Searching Authority, or the Declaration," PCT/US07/83201, received May 22, 2008, 9 pages.
European Patent Office, Extended European Search Report received in European patent application No. 07863721.2, dated Mar. 29, 2012, 8 pages.
Claims as of Mar. 29, 2012 in European patent application No. 07863721.2, 3 pages.
U.S. Appl. No. 11/982,256, Filed Oct. 31, 2007, Final Office Action, Mailed May 10, 2012.

* cited by examiner

PERFORMING TRICK PLAY FUNCTIONS IN A DIGITAL VIDEO RECORDER WITH EFFICIENT USE OF RESOURCES

CLAIM OF PRIORITY

The present application claims priority to U.S. Provisional Patent Application Ser. No. 60/855,890, titled "TRICK PLAY FOR ADVANCED CODECS," and filed on Oct. 31, 2006, and which is incorporated by reference herein for all purposes.

FIELD OF THE INVENTION

Embodiments of the invention generally relate to digital video recorders (DVRs). Embodiments of the invention relate more specifically to techniques for performing fast forward, rewind, and other trick play functions for a digital video recording that is managed by a digital video recorder.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Motion Pictures Experts Group (MPEG) specifies several standards for encoding video streams. The MPEG standards specify that an encoded video stream may contain multiple frames. An encoded video stream may be "interlaced" or "progressive." If an encoded video stream is interlaced, then each frame in the video stream includes two fields. The "top" field of an interlaced frame represents the odd-numbered horizontal lines of pixels in the frame, while the "bottom" field of an interlaced frame represents the even-numbered horizontal lines of pixels in the frame. As used herein, a "picture" is a representation of and encodes either a frame (in the case of progressive video streams) or a field (in the case of interlaced video streams). A picture that encodes a frame is called a "frame picture." A picture that encodes a single field is called a "field picture."

In addition to being either a frame picture or a field picture, a given picture may, additionally, be an intra-coded picture (an "I-picture"), a predictive-coded picture (a "P-picture"), or a bidirectionally-predictive-coded picture (a "B-picture"). I-pictures independently represent a complete frame or field within the video stream; data from no other picture in the video stream is needed in order to decode and present the frame or field that an I-picture represents. In contrast, P-pictures and B-pictures do not independently represent a complete frame or field within a video stream. P-pictures and B-pictures rely on data that is encoded by one or more other pictures in the video stream (in addition to the data that is encoded by those P-pictures and B-pictures themselves) in order to fully represent a complete frame or field within the video stream. More specifically, subcomponents ("blocks") of P-pictures and B-pictures refer to other pictures in a video stream.

Each picture in an MPEG-encoded video stream is subdivided into "macroblocks." Each "macroblock" is a set of 256 pixels that is 16 pixels high and 16 pixels wide. Each macroblock is further subdivided into "blocks." A "block" is a set of pixels. The size of a block in pixels may vary depending on the particular MPEG standard being used to encode a video stream.

In an MPEG-encoded video stream, pictures occur in "decode order" (the order in which those pictures will be decoded) rather than in "presentation order" (the order in which the content that those pictures represent will be presented). Because a particular picture cannot be completely decoded until all of the other pictures to which the particular picture's blocks refer have been decoded, such a particular picture is placed later in the decode-ordered MPEG-encoded video stream than such other pictures are at encoding time. As a result, at the time that the particular picture is decoded, the other pictures to which the particular picture's blocks refer will already have been decoded.

I-pictures and P-pictures are called "reference pictures" because the blocks of other pictures can refer to them. According to some encoding standards, B-pictures are not reference pictures because the blocks of other pictures do not refer to B-pictures under those standards. Blocks in a P-picture may refer back to a preceding (referring to presentation order) reference picture in the video stream. Blocks in a B-picture may refer to a pair of other pictures in the video stream. Such a pair includes a preceding (referring to presentation order) reference picture in the video stream and a following (referring to presentation order) reference picture in the video stream. Blocks in an I-picture do not refer to any other pictures in a video stream.

The MPEG-2 standard adheres to some specified restrictions with regard to which other pictures the blocks of a particular picture can refer. The MPEG-2 standard requires that the picture to which a P-picture's blocks refer be the same picture for all of the P-picture's blocks that refer to another picture; according to the MPEG-2 standard, different blocks of the same P-picture are not permitted to refer to different pictures in the video stream. Similarly, the MPEG-2 standard requires that the pair of pictures to which a B-picture's blocks refer be the same pair of pictures for all of the B-picture's blocks that refer to a pair of pictures; according to the MPEG-2 standard, different blocks of the same B-picture are not permitted to refer to different pairs of pictures in the video stream. The VC-1 encoding standard also adheres to the foregoing restrictions. In contrast, the MPEG-4 standard is not similarly restricted; different blocks of a given picture in an MPEG-4 encoded video stream may refer to different pictures (in the case of P-pictures) or different pairs of pictures (in the case of B-pictures) in the video stream.

Additionally, the MPEG-2 standard specifies that only the two most recently decoded frames of reference pictures be retained in a frame cache so that blocks of other pictures can refer to those decoded frames. Whenever a new frame of a reference picture is encountered in an MPEG-2 encoded video stream, if there are already two decoded frames in the frame cache, then one of the decoded frames is evicted from the frame cache to make room for the new frame. This imposes a limitation on the set of other frames to which blocks in an MPEG-2 encoded stream can refer. The VC-1 encoding standard also possesses the foregoing limitations. In contrast, under the MPEG-4 standard, 16 decoded frames of reference pictures (or, 32 decoded fields of reference pictures) may be retained in a frame cache so that blocks of other pictures can refer to those decoded frames. Thus, the set of other frames to which blocks can refer is much less limited under the MPEG-4 standard.

Additionally, under the MPEG-2 standard, whenever a frame needs to be evicted from the frame cache as discussed above, the least recently decoded frame is selected for eviction. In contrast, under the MPEG-4 standard, whenever a frame needs to be evicted from the frame cache, any specified one of the frames in the frame cache may be selected for eviction, regardless of how recently the specified frame was decoded.

Digital video recorder (DVR) functions include playback, random access, and "trick play" of content. Trick play functions include display pause, fast-forward, and rewind performed at various frame rates or display speeds. Despite the differences in MPEG-2 and other more advanced standards (e.g., VC1 (SMPTE-421M) and AVC (MPEG-4 Part 10, or H.264)), commercially available DVRs often handle trick play functionality as though those DVRs had to operate under at least some of the constraints of the older MPEG-2 standard. As a result, commercially available DVRs are providing, to their users, a trick play experience that is relatively unsophisticated and crude. Conventional approaches for performing trick play functions in a DVR typically use a large amount of resources—including processor resources, memory, and/or disk space—or provide a poor viewing experience, characterized by imprecise repositioning inside the stream, a low number of frames per second, etc. There is a need for an approach to provide trick play functions in a DVR, with an advanced codec or a conventional codec, in a way that consumes a limited amount of extra resources beyond those required for regular playback, while simultaneously providing a high quality viewer experience.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for performing trick play functions in a digital video recorder with efficient use of resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 DVR Overview
  3.0 Performing Trick Play Functions in a Digital Video Recorder with Efficient Use of Resources
  4.0 Implementation Mechanisms—Hardware Overview
  5.0 Extensions and Alternatives

- - -

1.0 General Overview

The needs identified in the foregoing Background, and other needs and objects that will become apparent for the following description, are achieved in the present invention, which comprises, in one aspect, a method for selecting a frame of a multi-frame video program for display in accordance with a selected trick play mode of a DVR. A DVR may perform such a method, for example.

DVRs ought to be able to play back video programs at speeds desired by users of those DVRs, including speeds that are faster than normal playback speed. For example, a user of a DVR might want the DVR to play a video stream at three times the normal playback speed. However, even assuming that the DVR has the processing power needed to decode a video stream's pictures at three times the normal playback rate, the display that the DVR is driving might not be able to display those pictures at three times the normal playback rate. For example, NTSC-compliant displays are able to display a maximum of 35 pictures per second. Under such circumstances, the DVR's decoding of some of the pictures, which will not be displayed during playback anyway, can be a waste of the DVR's processing resources.

Because DVRs store programs in encoded form (to preserve storage space), and because the pictures of those video programs require time and processing resources to decode, it is often not possible for a DVR (with limited processing power) to decode and play all of the temporally adjacent pictures of a program when the desired playback speed is faster than normal. Sometimes, certain pictures must be skipped during playback in order to maintain the desired playback speed.

For example, when a DVR user want to view a program at twice the normal playback speed, the limited resources of a DVR might not allow the DVR to decode twice as many pictures in the same amount of time in which the DVR would decode half that many pictures at normal playback speed. Depending on the DVR's resources, the DVR may be forced to skip some pictures. According to one approach, if the data stream is an MPEG-2 data stream, the DVR may merely skip the decoding and display of some or all B-pictures in the stream, since B-pictures are not reference pictures. However, sometimes when this is done, the quality of the viewing experience may be noticeably reduced. When pictures of a program are skipped during playback, the program may appear jittery. The displayed pictures may appear to be disjointed and to have little or nothing to do with each other. There may appear to be little or no visual transition between the displayed pictures.

Ideally, in order to preserve "smooth" viewing quality to the greatest extent possible while also satisfying playback speed requirements, the next picture to be displayed during playback should be as temporally close as possible (referring to presentation order) to the currently displayed picture within the constraints of playback speed. Some pictures can take longer to decode than others. As is discussed above, under the MPEG-4 standard, 16 decoded frames of reference pictures (or, 32 decoded fields of reference pictures) may be retained in a frame cache so that blocks of other pictures can refer to those decoded frames. A particular picture that contains blocks that refer back to a large quantity of other pictures can be computationally expensive to decode, since, under such circumstances, the DVR needs to ensure that each of those other pictures gets decoded first—if the decoding of the particular picture is not skipped, then none of the decoding of the other pictures to which the blocks of the particular picture refer can be skipped either. Accounting for the decoding costs of the pictures can help ensure that the "best" picture can be selected for decoding given user-specified playback speed requirements. Pictures that are associated with decode costs that are too high given the required playback speed may be excluded from the decoding process during faster-than-normal playback.

Certain embodiments of the invention take decode costs of pictures into account when selecting which pictures of a program to decode and display. According to one embodiment of the invention, for each picture of a plurality of pictures in a data stream that represents the program, a cost associated with decoding that picture is determined. Based on costs associated with pictures in the plurality of pictures, a particular picture is selected from among the plurality of pictures. The particular pictures is decoded and displayed.

In one embodiment of the invention, a DVR constructs a dependency graph that indicates, for each particular picture in a data stream, the minimum set of other pictures that the DVR will need to decode in order to decode that particular picture. The DVR may use the information indicated in the dependency graph in order to calculate the cost of decoding any picture in the data stream. Thus, in one embodiment of the invention, the DVR constructs a dependency graph for a data stream and then selects pictures to decode and display based on both information in the dependency graph and the playback speed currently specified by the DVR's user.

In other aspects, the invention encompasses a computer apparatus and a computer-readable medium configured to carry out the foregoing steps.

2.0 DVR Overview

Figure 3:
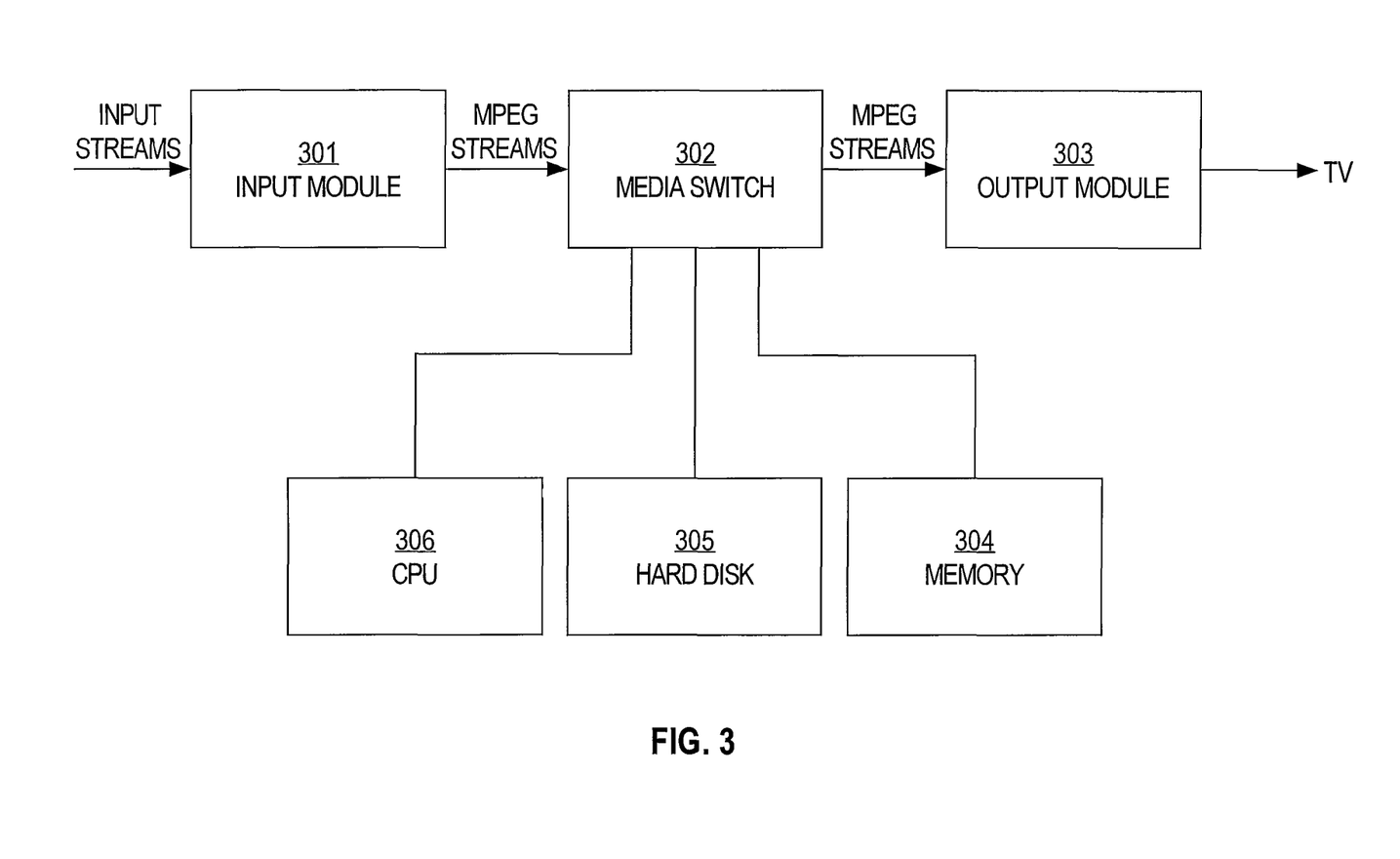
FIG. 3 is a block diagram that shows an example of the internal structure and operation of a DVR, according to an embodiment of the invention.

FIG. 3 is a block diagram that shows an example of the internal structure and operation of a DVR, according to an embodiment of the invention. An example of the internal structure and operation of a DVR is further described in U.S. Pat. No. 6,233,389, which is incorporated by reference as though originally disclosed herein.

The DVR shown in FIG. 3 comprises an input module 301, a media switch 302, and an output module 303. Input module 301 receives television (TV) input streams in any of a variety of forms. For example, a TV input stream received by input module 301 may take the form of a National Television Standards Committee (NTSC) compliant signal or a PAL compliant broadcast signal. For another example, a TV input stream received by input module 301 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment of the invention, input module 301 produces MPEG streams. According to another embodiment of the invention, input module 301 produces streams that are encoded using a different codec.

An MPEG-2 transport multiplex supports multiple programs in the same broadcast channel, which multiple video and audio feeds and private data. Input module 301 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 301 and passed to the other modules as if the signals had been delivered via an MPEG-2 private data channel.

Media switch 302 mediates between a microprocessor CPU 306, a hard disk or storage device 305, and memory 304. Input streams are converted to an MPEG stream and sent to media switch 302. Media switch 302 buffers the MPEG stream into memory 304. Media switch 302 then performs two operations if the DVR user is watching real-time TV: media switch 302 sends the MPEG stream to output module 303 and simultaneously writes the MPEG stream to hard disk or storage device 305.

Output module 303 receives MPEG streams as input and produces an analog TV signal according to NTSC, PAL, or other TV standards. Output module 303 comprises an MPEG decoder, an on-screen display (OSD) generator, an analog TV encoder, and audio logic. The OSD generator allows the program logic to supply images which may be overlaid on top of the resulting TV analog signal. Additionally, output module 303 can modulate information supplied by the program logic onto the VBI of the output signal in a number of standard formats, including NABTS, CC, and EDS.

3.0 Performing Trick Play Functions in a Digital Video Recorder with Efficient Use of Resources 3.1 Dependency Graph According to one embodiment of the invention, a DVR constructs a dependency graph of pictures in a data stream based on information that is contained in the headers of pictures within the data stream. For example, the DVR may determine, from the header of a particular picture in a data stream, a specified set of other pictures to which blocks of the particular picture refer. The DVR may obtain this information from the header of a picture in an MPEG-4 data stream, for example. If the data stream is an MPEG-4 data stream, then the blocks of a particular picture may refer to up to 16 other frame pictures (or up to 32 other field pictures) in the data stream.

In one embodiment of the invention, a DVR receives a data stream that represents pictures in decode order. As the DVR receives the data stream, the DVR examines the headers of the pictures in the data stream and builds and stores a dependency graph based on the dependency information contained in those headers. For each particular picture in the data stream, that particular picture's header identifies the other pictures to which blocks of the particular picture refer (and, therefore, upon which those blocks depend). In one embodiment of the invention, the DVR records a data stream off of a source (e.g., satellite, cable, etc.) and builds the dependency graph as the data stream is being recorded. Thus, by the time the DVR has recorded the entire data stream, the DVR will have completely constructed the dependency graph for the data stream. This does not mean that the dependency graph cannot be used until the graph is complete; in one embodiment of the invention, at any time while the DVR is recording an incoming data stream, the DVR can use the partially constructed dependency graph in order to perform certain operations more efficiently.

Figure 1:
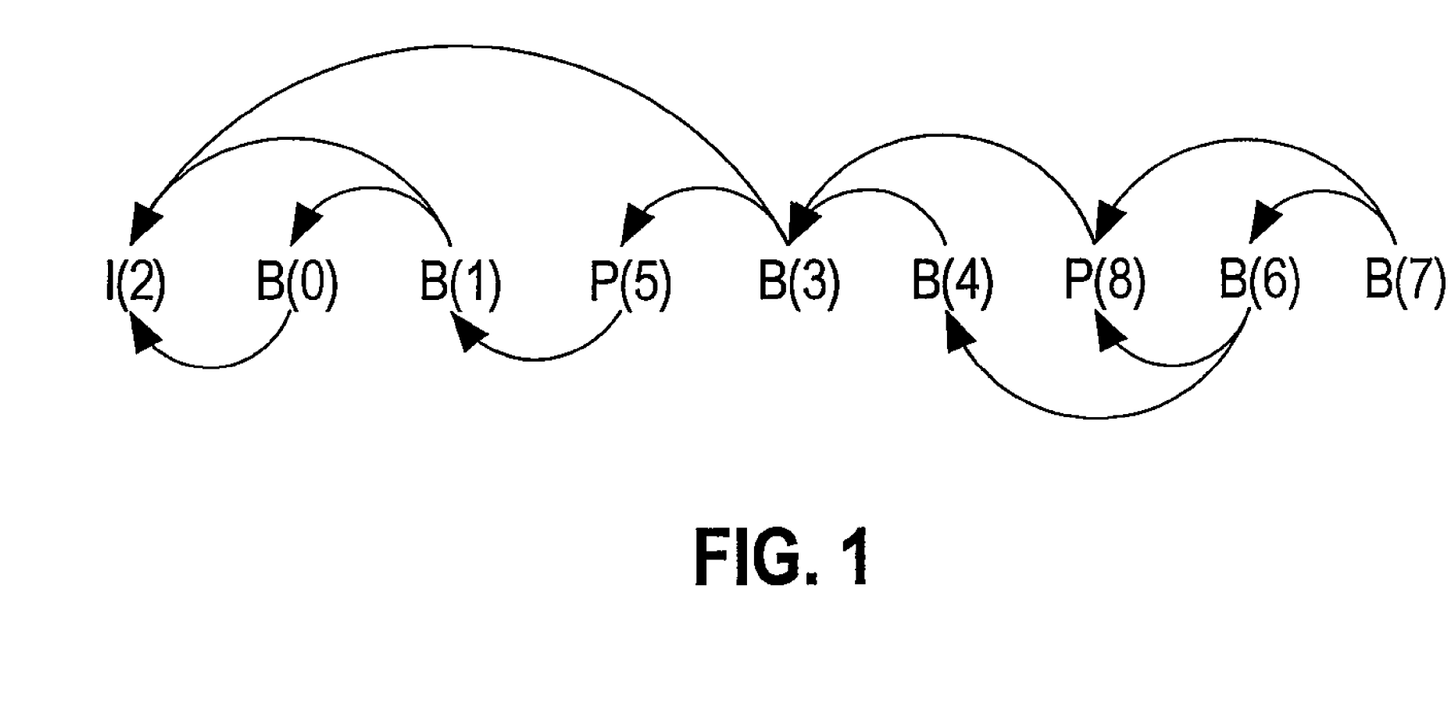
FIG. 1 illustrates an example of a representation of a series of pictures in a portion of a data stream that represents a motion video program.

FIG. 1 illustrates an example of a representation of a series of pictures in a portion of a data stream. The pictures, represented in FIG. 1 by letters that indicate those pictures' types (I, P, or B) occur in decode order within the data stream rather than in presentation order. The number in parenthesis for each picture indicates that picture's place in presentation order. In decode order, the pictures are: I(2), B(0), B(1), P(5), B(3), B(4), P(8), B(6), and B(7). In presentation order, the pictures are: B(0), B(1), I(2), B(3), B(4), P(5), B(6), B(7), and P(8). As indicated in FIG. 1, B(0) refers to I(2), B(1) refers to B(0) and I(2), P(5) refers to B(1), B(3) refers to I(2) and P(5), B(4) refers to B(3), P(8) refers to B(3), B(6) refers to P(8) and B(4), and B(7) refers to B(6). The data stream portion illustrated is assumed to conform to an encoding standard that allows B-pictures to act as reference pictures, although some encoding standards do not allow this.

Figure 2:
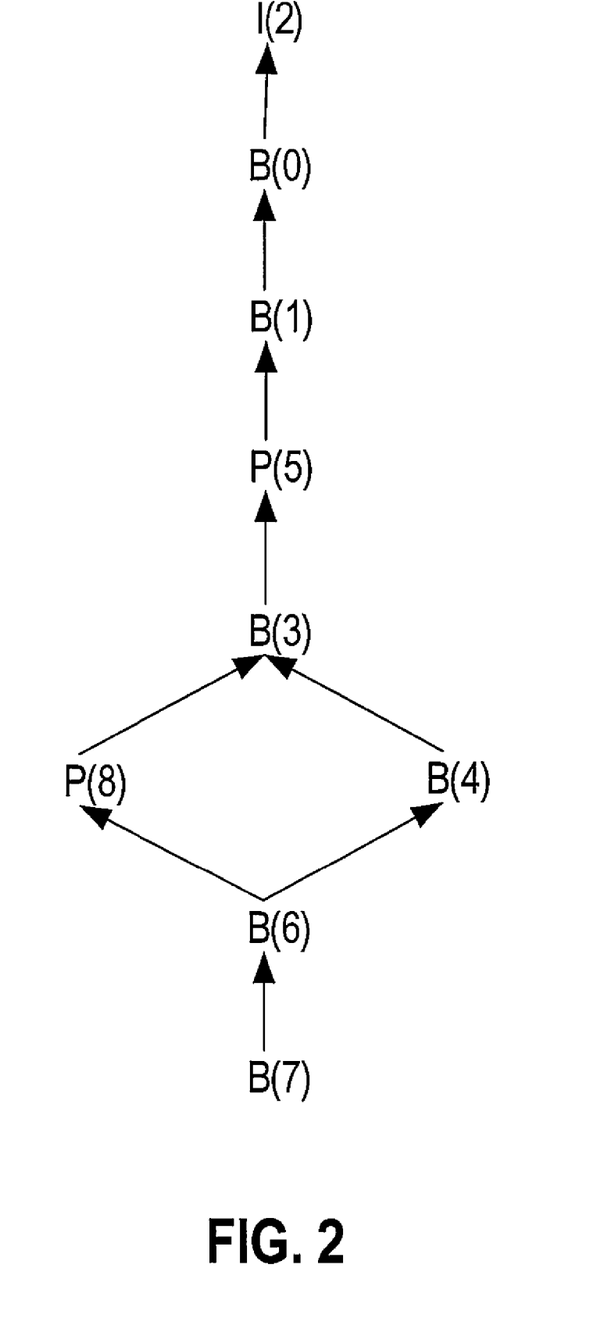
FIG. 2 illustrates an example of a dependency graph that a DVR constructs based on the series illustrated in FIG. 1, according to an embodiment of the invention.

FIG. 2 illustrates an example of a dependency graph that a DVR constructs based on the series illustrated in FIG. 1. The DVR initially adds I(2) to the graph. The DVR determines that B(0) refers to I(2), and so the DVR adds B(0) to the graph and adds, to the graph, a link from B(0) to I(2). The DVR determines that B(1) refers to both B(0) and I(2). The DVR adds B(1) to the graph and adds, to the graph, a link from B(1) to B(0). Since B(1) already links to B(0), and B(0) already links to I(2), the DVR does not need to add a link directly between B(1) and I(2). The DVR determines that P(5) refers to B(1), and so the DVR adds P(5) to the graph and adds, to the graph, a link from P(5) to B(1). The DVR determines that B(3) refers to both I(2) and P(5). The DVR adds B(3) to the graph and adds, to the graph, a link from B(3) to P(5). Since B(3) already links to P(5), and since P(5) already indirectly links to I(2) through the chain of links from P(5) to B(1) to B(0) to I(2), the DVR does not need to add a link directly between B(3) and I(2). The DVR determines that B(4) refers to B(3), and so the DVR adds B(4) to the graph and adds, to the graph, a link from B(4) to B(3). The DVR determines that P(8) also refers to B(3), and so the DVR adds P(8) to the graph and adds, to the graph, a link from P(8) to B(3). The DVR determines that B(6) refers to both P(8) and B(4), and so the DVR adds B(6) to the graph and adds, to the graph, one link between B(6) and P(8), and another link between B(6) and B(4). The DVR determines that B(7) refers to both B(6) and P(8). The DVR adds B(7) to the graph and adds, to the graph, a link from B(7) to B(6). Since B(7) already links to B(6), and B(6) already links to P(8), the DVR does not need to add a link directly between B(7) and P(8).

As can be deduced from the example above, in one embodiment of the invention, whenever the DVR is adding a picture to the dependency graph, before adding (based on reference information in pictures headers) a link between two pictures in the graph, the DVR first checks whether the two pictures are already linked indirectly through a chain of other existing links in the graph. If the DVR determines that the two pictures are already linked in this manner, then the DVR does not add, to the graph, a link directly between the two pictures. Alternatively, if the DVR determines that the two pictures are not already linked in this manner, then the DVR adds, to the graph, a link directly between the two pictures (assuming that at least one of the pictures' header information indicates that such a link should exist).

After the DVR has constructed the dependency graph illustrated in FIG. 2, the DVR can determine, for example, that before the DVR can completely decode and present B(4), the DVR will need to have already decoded the following pictures: I(2), B(0), B(1), P(5), and B(3). By determining that the decoding of B(4) will also require the decoding of 3 other pictures, the DVR can begin to estimate the cost of decoding B(4). The DVR can use such a cost, and costs associated with other pictures in the graph, when selecting which picture to decode and display next during a "trickplay" mode of operation.

In determining the cost of decoding a particular picture, the DVR may consult a picture cache in order to determine which of the other pictures, upon which the particular picture depends, have already been decoded. If one or more of the other pictures upon which the particular picture depends already resides in decoded form in the picture cache, then the DVR may reduce its estimate of the cost of decoding the particular picture. For example, although the decoding of B(4) requires the decoding of I(2), B(0), B(1), P(5), and B(3) in the example above, if I(2), B(0), B(1), P(5), and B(3) have already been decoded and are currently resident in the DVR's picture cache, then the cost of decoding B(4) may be as little as the cost of decoding B(4) by itself.

In an alternative embodiment of the invention, each picture is subdivided into two or more areas, and instead of reflecting dependencies from one entire picture to another entire picture, the graph reflects dependencies from an area of one picture to an area of another picture; each node of the graph may represent an area of some picture rather than an entire picture. For example, in one embodiment of the invention, each node of the graph might represent one half of a picture (e.g., either the left side or the right side). Thus, in one embodiment of the invention, the graph may indicate dependencies at a granularity that is finer than an entire picture. In such an embodiment of the invention, the DVR may determine the cost of decoding a particular picture based at least in part on the costs of decoding the areas into which that particular picture is subdivided.

Once the DVR has constructed the dependency graph, the DVR can use the dependency graph to improve the performance of various operations that the user might command the DVR to perform. One such operation is "random access," in which the user specifies a location within a data stream (e.g., via a time line) that the user wants to view immediately; the user might instruct the DVR to "jump" to this specified location in the data stream and begin presenting the program represented by the data stream at that specified location. Another such operation (or class of operations) is "trick play," in which the user indicates a multiplier (e.g., twice as fast, three times as fast, etc., in either forward or reverse). In performing such an operation, the DVR presents pictures from the data stream at the user-specified faster rate, either in forward or reverse, as the user has specified.

3.2 Random Access Operations

For example, a user might instruct the DVR to begin presenting a program at a temporal location that corresponds to picture B(3) (headers in the pictures in the data stream may indicate time stamps that indicate the times at which the pictures are supposed to be presented relative to each other). Under such circumstances, B(3) is the "target" picture. This is a random access operation. In response, the DVR may determine, from the dependency graph, a cost for decoding B(3) based on the fact that, in order to decode B(3), the DVR will need to first decode I(2), B(0), B(1), and P(5) (as well as B(3) itself)—assuming that none of these pictures has already been decoded and currently resides in the DVR's picture cache (typically, when a random access operation is performed, the temporal location to which the DVR's user wants to "jump" will be far enough away from the current location that any already decoded pictures in the DVR's picture cache will not be useful in performing the operation). The greater the number of other pictures that need to be decoded before a particular picture (e.g., B(3)) can be decoded, the higher the estimated cost of decoding that particular picture typically will be.

Thus, in one embodiment of the invention, the initial estimated cost for decoding a particular picture (or area) is equal to the total number of other pictures (or areas) that the DVR will need to decode in order to decode the particular picture (or area). If any of these other pictures upon which B(3) depends already resides in the DVR's picture cache, then the DVR may use that fact to reduce the estimated cost of decoding B(3). For example, if P(5) already has been decoded and currently resides in the DVR's picture cache, then the DVR may determine that only the decoding cost of B(3) by itself will influence the total cost of decoding B(3) (if P(5) is already in the picture cache, then there is no need to decode any of I(2), B(0), or B(1), even if B(3) also depends on these, since these were already used to decode P(5)).

After the DVR has determined a decoding cost for B(3), which is, in this example, the picture to which the DVR's user wants to "jump" in a random access operation, the DVR may also determine decoding costs, in a similar manner, for other pictures that are temporally close to B(3) in presentation order. For example, the DVR might also determine decoding costs for I(2) and B(4), both of which are next to B(3) in presentation order. The DVR might determine that the cost of decoding I(2) is significantly lower than the cost of decoding B(3), because the decoding of I(2) does not require any other picture to be decoded (I(2) does not depend on any other picture).

For each picture in a set of pictures that are temporally close (in presentation order) to the "target" picture (B(3) in this example), the DVR may determine a weighted cost for that picture. Such a weighted cost may be based on both (a) the decoding cost of the picture and (b) the temporal distance (in presentation order) from the target picture. Pictures that are very temporally close to the target picture are weighted more favorably that those that are not as temporally close—thus, the target picture may be weighted more favorably than all of the other pictures. Despite this favorable weighting, the target picture's weighted cost may still exceed the weighted costs of other temporally close pictures due to the target picture's potentially higher decoding cost. In one embodiment of the invention, in order to determine a given picture's weighted cost, the DVR multiplies that picture's decoding cost by an amount that is based on the temporal distance (e.g., in time units) of that picture is from the target picture. For example, to calculate the weighted cost for a picture that is 2 seconds away from the target picture, the DVR might multiply that picture's decoding cost by 2. In such an embodiment, the target picture's weighted cost may be set equal to the target picture's decoding cost (to avoid multiplication by zero).

In various different embodiments of the invention, a picture's decoding cost may be given different degrees of influence on the picture's weighted cost relative to the picture's temporal distance from the target picture; in one embodiment of the invention, the decoding cost might be more influential on the weighted cost than the temporal distance is, while in another embodiment of the invention, the decoding cost might be less influential on the weighted cost than the temporal distance is.

Based on the weighted costs that are associated with each picture so considered (which may be a selected subset of all of the pictures, such as the set of ten (or some other specified number of) pictures that are temporally closest to the target picture in presentation order, both earlier and later), the DVR may select one of the pictures based on that picture's weighted cost. For example, the DVR may select the picture that is associated with the lowest weighted cost. This picture might or might not be the target picture. This picture might or might not be the picture with the lowest decoding cost. After selecting the picture, in one embodiment, the DVR decodes the selected picture and any other pictures that the DVR needs to decode in order to decode the selected picture. The DVR then presents the decoded selected picture and proceeds to present the data stream's content from that point in the data stream, thereby completing the random access operation.

By selecting a picture with the lowest weighted cost, the DVR may reduce the amount of time that the user has to wait for the DVR to jump to the desired position in the data stream, while also jumping to a position that is so temporally close to the point that the user actually specified as to be practically indistinguishable from that point. The techniques described above may be contrasted to an approach in which the DVR always jumps to the target picture; such an approach may sometimes produce an intolerably long delay while the DVR decodes a large quantity of pictures. The techniques described above also may be contrasted to an approach in which the DVR always jumps to the I-picture that exists most closely to the target picture in decode order in the data stream; such an approach may sometimes cause the DVR to jump to a location which is very temporally distant, in presentation order, from the position to which the user actually wanted to jump.

3.3 Trickplay Operations

As is discussed above, a DVR also may use the dependency graph to choose which pictures ought to be decoded and displayed during a "trick play" mode of operation. There are four general types of trick play operations: (1) playing the data stream forward at faster than normal playback speed, (2) playing the data stream backward at normal or faster than normal playback speed, (3) playing the data stream forward at slower than normal playback speed, and (4) playing the data stream backward at slower than normal playback speed.

When the DVR plays a data stream forward at slower than normal playback speed, no special considerations need to be taken into account. Assuming that the DVR is capable of decoding and playing, at normal playback speed, all pictures in a data stream, the DVR should also be capable of decoding and playing all such pictures at any speed that is slower than normal playback speed. Thus, when performing such a trick play operation, the DVR may actually decode and play every picture that is in the data stream. The DVR does not need to skip the decoding or presentation of any pictures under such circumstances.

However, when the DVR plays a data stream forward or backward at faster than normal playback speed, the DVR might not be capable (due to processing limitations) of decoding and presenting every picture at the rate specified by the DVR's user. For example, the DVR's user might want the DVR to present the program represented by the data stream at three times normal playback speed, but the DVR might not be capable of decoding pictures at three time normal playback speed (the DVR might be capable of decoding pictures at half this rate, for example). Thus, the DVR might need to select, from among the pictures in the data stream, a subset of pictures that the DVR will decode and present to the user. According to one embodiment of the invention, the DVR uses the information in the dependency graph to make a better selection of pictures to decode and present to the user, to maintain temporal presentation coherence as much as possible while also satisfying the user's playback rate demands.

According to one embodiment of the invention, when the user's specified playback rate is greater than the rate at which the DVR can decode pictures, the DVR decodes pictures at as great a rate as the DVR can, while skipping the decoding and presentation of at least some of the pictures in the data stream in order to maintain the user-specified playback rate. In order to provide a "smooth" viewing experience for the DVR user (by not waiting for unduly long periods of time in between the presentations of different pictures), the DVR selects, decodes, and presents pictures based at least in part on those pictures' decode costs. Decode costs and the computations thereof are discussed above in the context of random access operations.

In one embodiment of the invention, during faster-than-normal forward playback mode, at user-specified rates that are faster than the rate at which the DVR can decode pictures, the DVR divides the user-specified playback rate (e.g., 60 pictures per second) by the fastest rate at which the DVR can actually decode pictures (e.g., 7.5 pictures per second). The quotient may be referred to as the "skipping number." The DVR locates the picture that is temporally that many seconds ahead of the current picture (in presentation order), rounding to the nearest whole number if the result is not a whole number; for example, if the current picture is at the 3-second position, presentation-wise, and if the skipping number is 8 (i.e., 60/7.5), then the DVR locates the picture that is at the 13-second position (i.e., 3+8), presentation-wise. In some embodiments of the invention, the skipping number may be selected to be some specified amount larger than the quotient discussed above, to compensate for the time that it will take for the DVR to locate and decode an appropriate picture.

For example, the picture at the 13-second position might be B(97). This makes B(97) the "target" picture—the picture that the DVR ought to decode and present if the DVR can do so sufficiently fast. However, if B(97) has a very high decode cost (e.g., because B(97) depends on a large quantity of other pictures), then the DVR might not be able to maintain the user-specified rate if the DVR actually decodes and presents B(97). The DVR computes the decode cost for B(97) and determines whether the decode cost is below a specified threshold. The specified threshold may be a value that is selected based on information about how fast the DVR can decode a single picture, for example; this value may depend on the DVR's hardware and configuration, and may vary from DVR to DVR. If the decode cost is below the specified threshold, then this signifies that the DVR is able to decode and present B(97) with a speed that will be sufficiently fast to maintain the user-specified playback rate. Under such circumstances, the DVR decodes B(97) (and any other pictures that need to be decoded in order to decode B(97), as specified in the dependency graph), and presents B(97) to the user before performing the above process again, this time with B(97) as the current picture.

Alternatively, if the decode cost is not below the specified threshold, then this signifies that the DVR is not able to decode and present B(97) with a speed that will be sufficiently fast to maintain the user-specified playback rate. Under such circumstances, the DVR searches for another picture that (a) can be decoded with a speed that will be sufficiently fast to maintain the user-specified playback rate and also (b) is as temporally close (in presentation order) as possible to B(97), the "target" picture in this example.

In one embodiment of the invention, in order to find this picture, the DVR forms a set of other pictures (e.g., sixteen pictures or some other specified number of pictures) that are temporally close to the target picture (B(97) in this example) in presentation order (both before and after the target picture). Using the dependency graph, the DVR computes the decode cost for each of these other pictures. If at least one of these other pictures has a decode cost that is below the specified threshold, then the DVR selects, from among the pictures whose decode cost is less than the specified threshold, the picture that is temporally closest (in presentation order) to the target picture. Under such circumstances, the DVR decodes the selected picture (and any other pictures that need to be decoded in order to the selected picture), and presents the selected picture to the user before performing the above process again, this time with the target picture B(97) (not the selected picture, so as to prevent incremental temporal "slipping" in playback) as the new current picture.

Alternatively, if none of the other pictures has a decode cost that is below the specified threshold, then, in one embodiment of the invention, the DVR merely presents the current picture again before performing the above process again, this time with the target picture (e.g., B(97), which was not decoded or presented in this case) as the new current picture. Under such circumstances, the DVR cannot locate any suitable picture to decode and present while maintaining the user-specified playback rate, and so the DVR simply presents the same picture again before moving on. Ideally, this situation is avoided as often as possible, since this situation reduces the "smoothness" of the presentation, and ultimately results in a larger temporal gap between presented pictures.

In at least some embodiments of the invention, whenever the DVR computes the decode cost for any picture, the DVR reduces the decode cost for that picture by a commensurate amount if one or more other pictures upon which that picture depends already resides, in decoded form, in the DVR's picture cache. Under such circumstances, the DVR might not require as much time to decode the picture, and so the picture's decode cost is reduced by an extent that is based on the time that will be saved due to the presence of the other pictures in the DVR's picture cache.

In one embodiment of the invention, during faster-than-normal backward playback mode, at user-specified rates that are faster than the rate at which the DVR can decode pictures, the DVR uses a technique that is similar to that described above for faster-than-normal forward playback mode, except that instead of locating a target picture that is temporally ahead of the current picture in presentation order, the DVR locates a target picture that is temporally behind the current picture in presentation order, based on the skipping number.

In one embodiment of the invention, if the DVR is capable of decoding pictures at the user-specified playback rate, then the DVR decodes and plays all pictures in the data stream regardless of whether the user-specified playback rate is greater than the normal playback rate. Thus, in one embodiment of the invention, the DVR only skips the decoding and presentation of some pictures in situations where the user-specified playback rate is greater than the DVR's maximum picture decode rate.

4.0 Implementation Mechanisms—Hardware Overview

Figure 4:
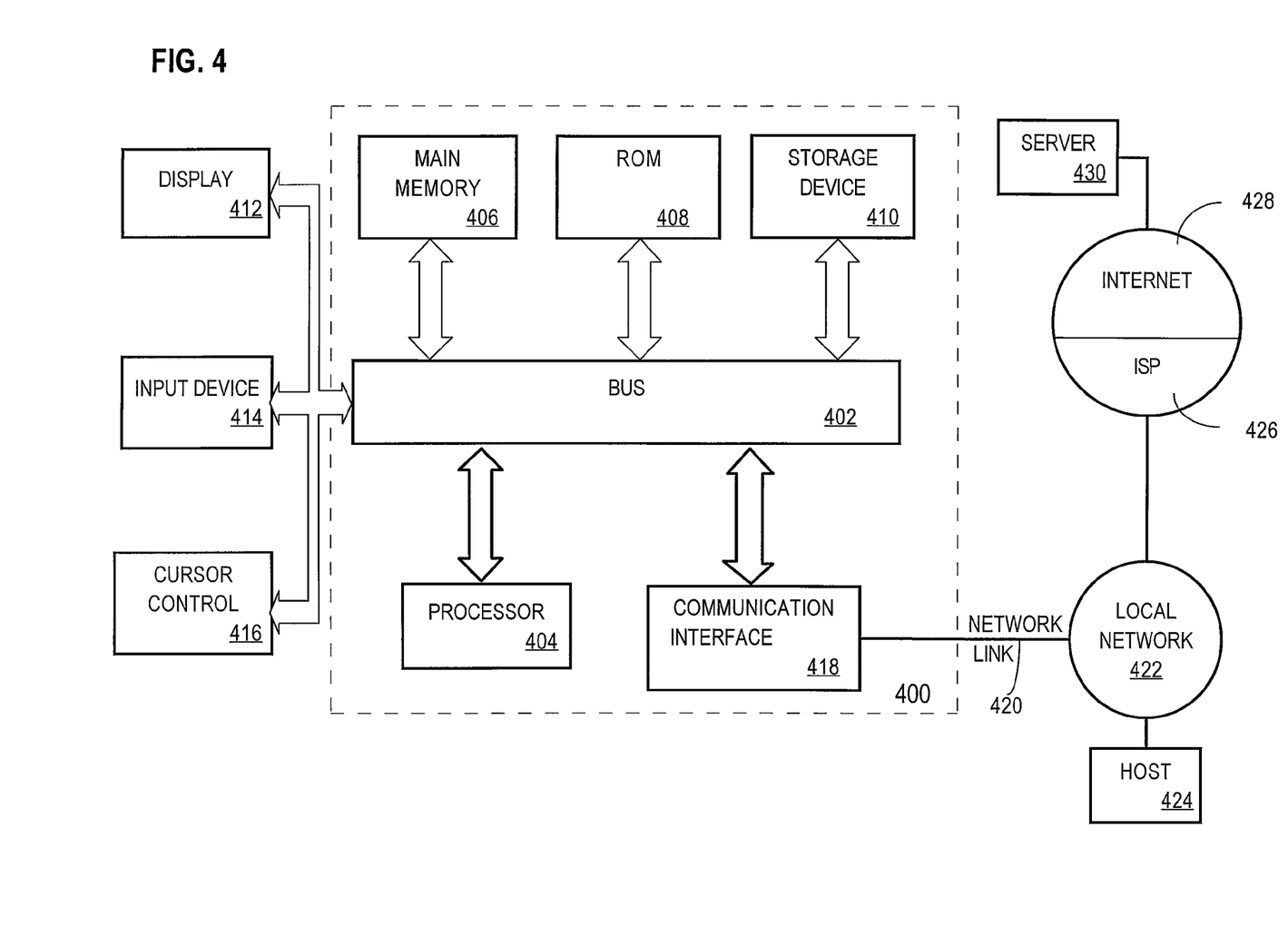
FIG. 4 is a block diagram that illustrates a digital video recorder upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for selecting a frame of a multi-frame video program for display in accordance with a selected trick play mode of a DVR. According to one embodiment of the invention, selecting a frame of a multi-frame video program for display in accordance with a selected trick play mode of a DVR is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for selecting a frame of a multi-frame video program for display in accordance with a selected trick play mode of a DVR as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for selecting a picture of a multi-picture video program for display, the method comprising:

determining, for each picture of a plurality of pictures in a data stream that represents the program, a cost associated with decoding that picture;

determining, based at least in part on a user-specified playback rate, a target picture that is a first specified temporal distance away from a current picture in presentation order;

determining a decode cost for the target picture;

determining whether the decode cost for the target picture is below a specified threshold;

when the decode cost for the target picture is below the specified threshold, then decoding and presenting the target picture; and when the decode cost for the target picture is not below the specified threshold, then performing steps comprising:
   determining a particular set of other pictures that are within a second specified temporal distance away from the target picture in presentation order;
   selecting, from the particular set of other pictures, one or more pictures that are associated with decode costs that are below the specified threshold; and
   decoding and presenting at least one of the one or more pictures that are associated with decode costs that are below the specified threshold;
outputting the particular picture for display;
wherein the method is performed by one or more computing devices.

2. The method of claim 1, further comprising:
receiving at least a part of the data stream at a digital video recorder (DVR);
encoding, based on a codec, each picture in the plurality of pictures; and
generating and storing, at the DVR, a dependency graph that indicates which pictures in the plurality of pictures depend from which other pictures in the plurality of pictures.

3. The method of claim 1, wherein the step of determining a cost for each picture of the plurality of pictures comprises:
determining, for each individual picture in the plurality of pictures, a minimum number of other pictures that need to be decoded before a picture corresponding to that individual picture can be displayed.

4. The method of claim 1, wherein the step of determining a cost for each picture of the plurality of pictures comprises performing, for each individual picture in the plurality of pictures, steps comprising:
determining a set of one or more other pictures upon which the individual picture depends in order to a represent a complete frame; and
determining how many pictures in the set of pictures already have been decoded and are already present in a DVR's picture cache.

5. The method of claim 1, wherein each picture of the plurality of pictures is at least one of an I-picture, a P-picture, or a B-picture.

6. The method of claim 1, further comprising:
receiving, at a DVR, a request to begin playing the program at a specified point in the program;
in response to receiving the request, performing steps comprising:
   determining a target picture that corresponds to the specified point; and
   determining a decode cost for the target picture, wherein the decode cost is based at least in part on a number of other pictures that need to be decoded in order to decode the target picture.

7. The method of claim 6, wherein the step of decoding and presenting the target picture further comprises decoding one or more other pictures upon which the target picture depends.

8. The method of claim 1, wherein the step of selecting the one or more pictures based on decode costs comprises:
selecting one or more pictures from among the particular set of other pictures based at least in part on whether costs associated with pictures in the particular set of other pictures exceed a specified value that corresponds to a maximum amount of time that is allowed to pass between times that different pictures of the program are displayed while a digital video recorder (DVR) is operating within a specified mode.

9. A digital video recorder (DVR) that is configured to:
determine, for each picture of a plurality of pictures in a data stream that represents a program, a cost associated with decoding that picture;
determine, based at least in part on a user-specified playback rate, a target picture that is a first specified temporal distance away from a current picture in presentation order;
determine a decode cost for the target picture;
determine whether the decode cost for the target picture is below a specified threshold;
decode and present the target picture when the decode cost for the target picture is below the specified threshold; and
perform at least the following steps when the decode cost for the target picture is not below the specified threshold:
   determining a particular set of other pictures that are within a second specified temporal distance away from the target picture in presentation order;
   selecting, from the particular set of other pictures, one or more pictures that are associated with decode costs that are below the specified threshold; and
   decoding and presenting at least one of the one or more pictures that are associated with decode costs that are below the specified threshold;
output the particular picture for display.

10. The DVR of claim 9, wherein the DVR is further configured to:
receive at least a part of the data stream;
encode, based on a codec, each picture in the plurality of pictures; and
generate and store a dependency graph that indicates which pictures in the plurality of pictures depend from which other pictures in the plurality of pictures.

11. The DVR of claim 9, wherein the DVR is further configured to:
determine, for each individual picture in the plurality of pictures, a minimum number of other pictures that need to be decoded before a picture corresponding to that individual picture can be displayed.

12. The DVR of claim 9, wherein the DVR is further configured to perform, for each individual picture in the plurality of pictures, steps comprising:
determining a set of one or more other pictures upon which the individual picture depends in order to a represent a complete frame; and
determining how many pictures in the set of pictures already have been decoded and are already present in a DVR's picture cache.

13. The DVR of claim 9, wherein each picture of the plurality of pictures is at least one of an I-picture, a P-picture, or a B-picture.

14. The DVR of claim 9, wherein the DVR is further configured to:
receive a request to begin playing the program at a specified point in the program; and
in response to receiving the request, perform steps comprising:
   determining a target picture that corresponds to the specified point; and
   determining a decode cost for the target picture, wherein the decode cost is based at least in part on a number of other pictures that need to be decoded in order to decode the target picture.

15. The DVR of claim 14, wherein decoding and presenting the target picture further comprises decoding one or more other pictures upon which the target picture depends.

16. The DVR of claim 9, wherein the DVR is further configured to:
- select one or more pictures from among the particular set of other pictures based at least in part on whether costs associated with pictures in the particular set of other pictures exceed a specified value that corresponds to a maximum amount of time that is allowed to pass between times that different pictures of the program are displayed while the DVR is operating within a specified mode.

17. A non-transitory computer readable medium storing instructions, which when executed by one or more processors perform steps comprising:
- determining, for each picture of a plurality of pictures in a data stream that represents the program, a cost associated with decoding that picture;
- determining, based at least in part on a user-specified playback rate, a target picture that is a first specified temporal distance away from a current picture in presentation order;
- determining a decode cost for the target picture;
- determining whether the decode cost for the target picture is below a specified threshold;
- when the decode cost for the target picture is below the specified threshold, then decoding and presenting the target picture; and
- when the decode cost for the target picture is not below the specified threshold, then performing steps comprising:
  - determining a particular set of other pictures that are within a second specified temporal distance away from the target picture in presentation order;
  - selecting, from the particular set of other pictures, one or more pictures that are associated with decode costs that are below the specified threshold; and
  - decoding and presenting at least one of the one or more pictures that are associated with decode costs that are below the specified threshold;
- outputting the particular picture for display.

18. The non-transitory computer readable medium of claim 17, further comprising:
- receiving at least a part of the data stream at a digital video recorder (DVR);
- encoding, based on a codec, each picture in the plurality of pictures; and
- generating and storing, at the DVR, a dependency graph that indicates which pictures in the plurality of pictures depend from which other pictures in the plurality of pictures.

19. The non-transitory computer readable medium of claim 17, wherein the step of determining a cost for each picture of the plurality of pictures comprises:
- determining, for each individual picture in the plurality of pictures, a minimum number of other pictures that need to be decoded before a picture corresponding to that individual picture can be displayed.

20. The non-transitory computer readable medium of claim 17, wherein the step of determining a cost for each picture of the plurality of pictures comprises: performing, for each individual picture in the plurality of pictures, steps comprising:
- determining a set of one or more other pictures upon which the individual picture depends in order to a represent a complete frame; and
- determining how many pictures in the set of pictures already have been decoded and are already present in a DVR's picture cache.

21. The non-transitory computer readable medium of claim 17, wherein each picture of the plurality of pictures is at least one of an I-picture, a P-picture, or a B-picture.

22. The non-transitory computer readable medium of claim 17, further comprising:
- receiving, at a DVR, a request to begin playing the program at a specified point in the program;
- in response to receiving the request, performing steps comprising:
  - determining a target picture that corresponds to the specified point; and
  - determining a decode cost for the target picture, wherein the decode cost is based at least in part on a number of other pictures that need to be decoded in order to decode the target picture.

23. The non-transitory computer readable medium of claim 22, wherein the step of decoding and presenting the target picture further comprises decoding one or more other pictures upon which the target picture depends.

24. The non-transitory computer readable medium of claim 17, wherein the step of selecting the one or more pictures based on decode costs comprises:
- selecting one or more pictures from among the particular set of other pictures based at least in part on whether costs associated with pictures in the particular set of other pictures exceed a specified value that corresponds to a maximum amount of time that is allowed to pass between times that different pictures of the program are displayed while a digital video recorder (DVR) is operating within a specified mode.

\* \* \* \* \*